(12) United States Patent  
Xiao et al.

(10) Patent No.: US 8,779,285 B2
(45) Date of Patent: Jul. 15, 2014

(54) JUNCTION BOX EASY TO REMOVE AND MAINTAIN

(75) Inventors: Xue-Yuan Xiao, Kunshan (CN); Hong-Qiang Han, Kunshan (CN); Zi-Qiang Zhu, Kunshan (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 47 days.

(21) Appl. No.: 13/542,643

(22) Filed: Jul. 5, 2012

(65) Prior Publication Data

US 2013/0012059 A1 Jan. 10, 2013

(30) Foreign Application Priority Data

Jul. 5, 2011  (CN) .......................... 2011 2 0234261
Jul. 5, 2011  (CN) .......................... 2011 2 0234329
Jul. 5, 2011  (CN) .......................... 2011 2 0234511

(51) Int. Cl.
  *H02G 3/08* (2006.01)
(52) U.S. Cl.
  USPC ................ 174/50; 174/58; 174/64; 439/76.1; 136/244
(58) Field of Classification Search
  USPC .......... 174/50, 58, 64, 535, 59, 480; 136/244, 136/245, 246, 251; 439/142, 718, 76.1, 439/76.2, 535; 361/600, 601
  See application file for complete search history.

(56) References Cited

U.S. PATENT DOCUMENTS 7,939,754 B2 * 5/2011 Richter et al. .................. 174/50
8,512,050 B2 * 8/2013 McGreevy et al. .......... 439/76.1

FOREIGN PATENT DOCUMENTS

EP          2279529          2/2011

* cited by examiner

*Primary Examiner* — Dhirubhai R Patel
(74) *Attorney, Agent, or Firm* — Wei Te Chung; Ming Chieh Chang

(57) ABSTRACT

A junction box includes a cable connecting body and a cover covering the cable connecting body. The cable connecting body includes an insulative block, a plurality of connecting foils retained in the insulative block and a plurality of diodes connecting with two neighborly connecting foils. The connecting foils are insert-molded with the insulative block. The insulative block has a hook and the cable connecting body has a front wall with a depressing slot corresponding to the hook. The hook and the depressing slot engage with each other, when the insulative block is damaged, the user can remove the insulative block away from the junction box by levering the hook.

17 Claims, 11 Drawing Sheets

JUNCTION BOX EASY TO REMOVE AND MAINTAIN

BACKGROUND OF THE INVENTION

1. Field of the Invention

The present invention generally relates to a junction box, and more particularly to a junction box with a simple structure easy to remove and maintain.

2. Description of Related Art

EP patent publication NO. 2279529 published on Feb. 2, 2011 discloses a PV junction box including an insulative box, a cover covering the insulative box, a plurality of connecting foils and a plurality of diodes connecting with two neighborly connecting foils. The insulative box includes a bottom wall, a front wall, a rear wall and two side walls extending upwardly from the bottom wall and a cavity defined by these walls. Two through holes are defined in the front wall for outside cables passing therethrough. The connecting foils comprise a plurality of body portions insert-molded in the bottom wall. The bottom face of the body portion is hidden under the bottom wall and the top face is exposed in the cavity. However, when the PV (photovoltaic) junction box is retained in the PV module, the junction box is presented as an airproof box, the diodes generate heat and transmit the heat to the air of the cavity by the contacting foils. Then the heat dissipates outside by the cover after the air transmitting the heat to the cover. In view of the poor thermal radiation properties of metal materials, heat generated by the contacting foils will not dissipate timely, which may destroy the junction box. Even more, because of the contacting foils are retained in the bottom wall and the bottom wall and the insulative box are formed in one piece, if one part of the junction box is destroyed, the junction box should be removed from the PV module and can not be replaced partly, which causes a waste, furthermore, it is difficult for user to remove the junction box from the PV module.

Hence, an improved junction box is desired to overcome the above problems.

SUMMARY OF THE INVENTION

An objector of the invention is to provide a junction box which is easy to remove and maintain.

According to one aspect of the present invention, a junction box comprises an cable connecting body including an insulative block, a plurality of connecting foils insert-molded in the insulative block and a plurality of diodes connecting with two neighborly connecting foils; a cover covering the cable connecting body; The insulative block and the connecting foils are formed an wire connecting module, the wire connecting module comprising at least a hook and the cable connecting body comprising at least a depressing slot corresponding to the hook.

Other objects, advantages and novel features of the present invention will become more apparent from the following detailed description of the present embodiment when taken in conjunction with the accompanying drawings.

DETAILED DESCRIPTION OF THE INVENTION

Figure 1:
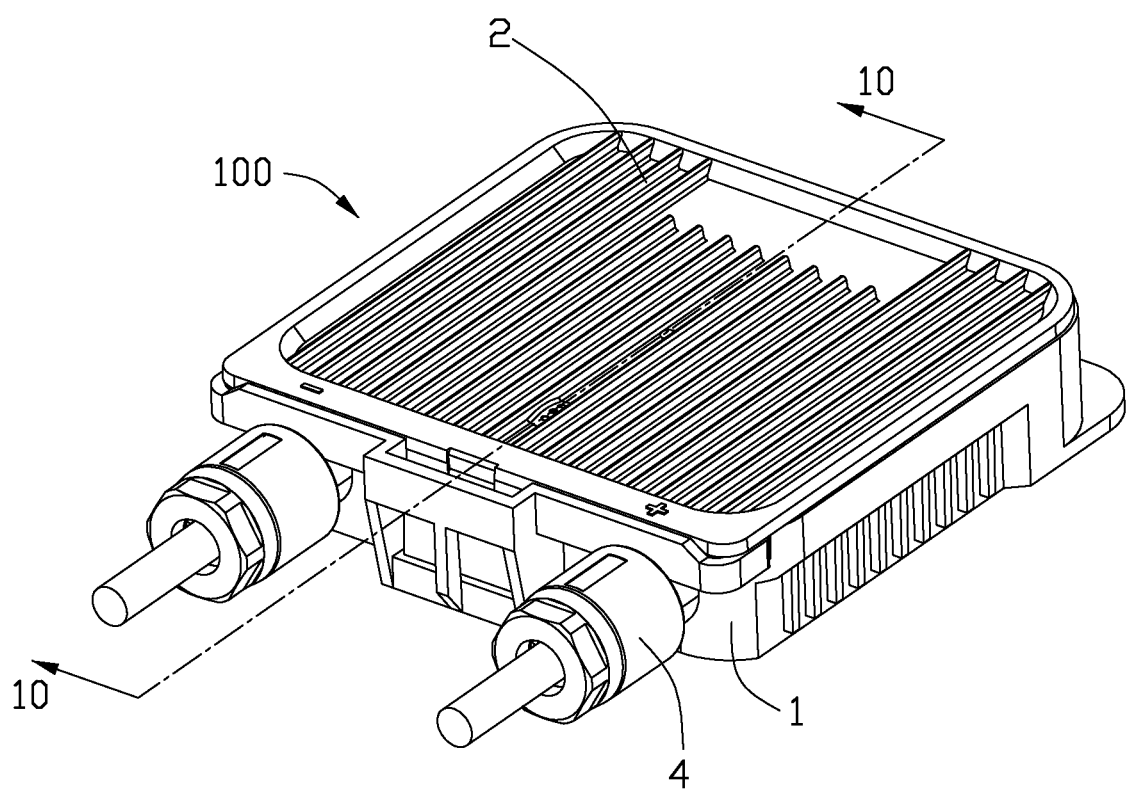
FIG. 1 is an assembled perspective view of a junction box according to a preferred embodiment of the present invention.
Figure 2:
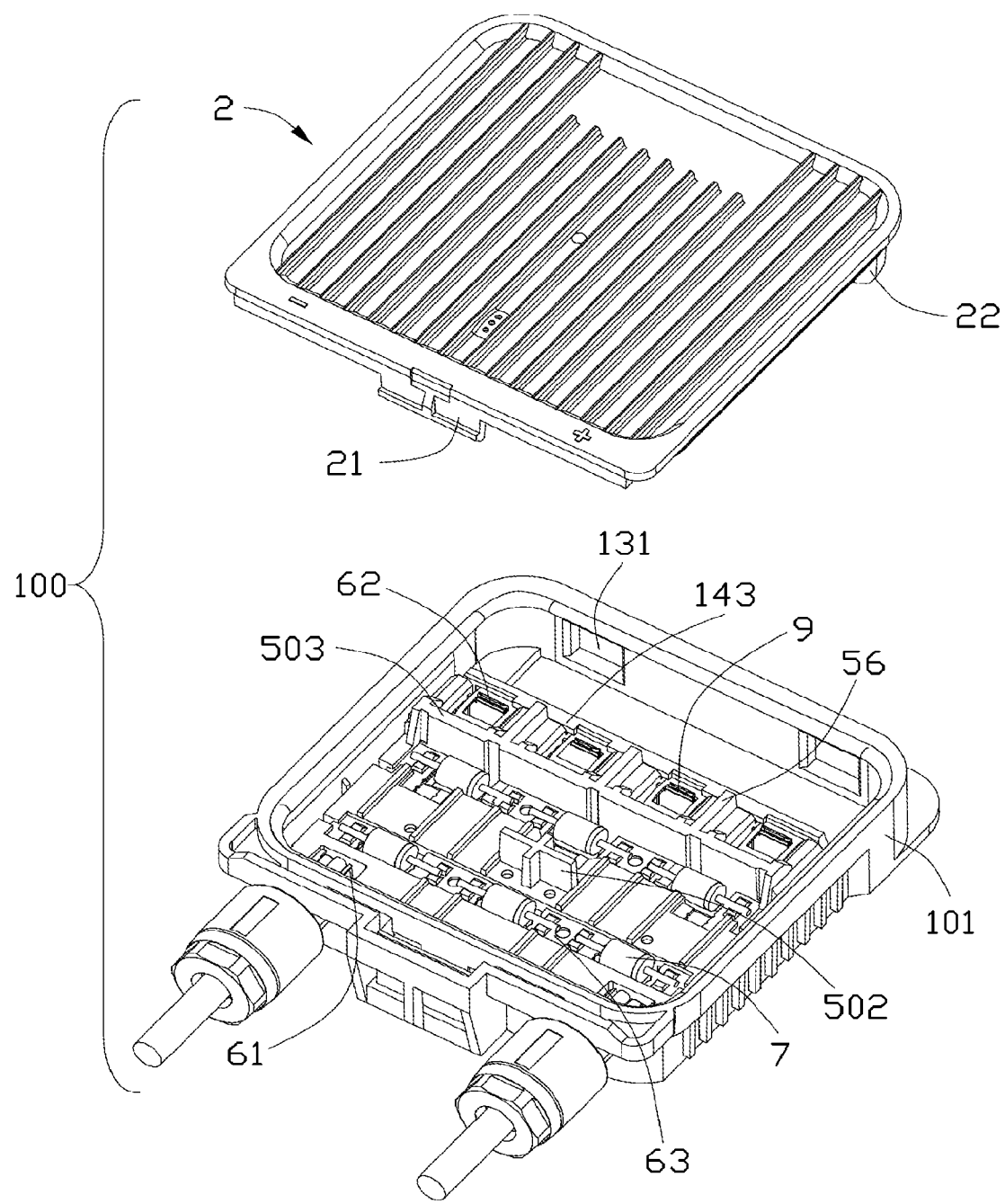
FIG. 2 is another assembled perspective view of the junction box according to the present invention, but taken from another view, which discloses the cover separated from a cable connecting box.

Reference will now be made to the drawing figures to describe the preferred embodiment of the present invention in detail.

Referring to FIGS. 1-11, a junction box 100 used for electrically connecting a photovoltaic (PV) module (not labeled) and transmitting electrical current according to the present invention is disclosed. The junction box 100 includes a cable connecting body 101, a cover 2 covering an upper side of the cable connecting body 101 and a cable 4 connecting with the cable connecting body 101. The cable connecting body 101 includes a plastic insulative body 1 and a wire connecting module 3 attached to the insulative body 1.

Figure 3:
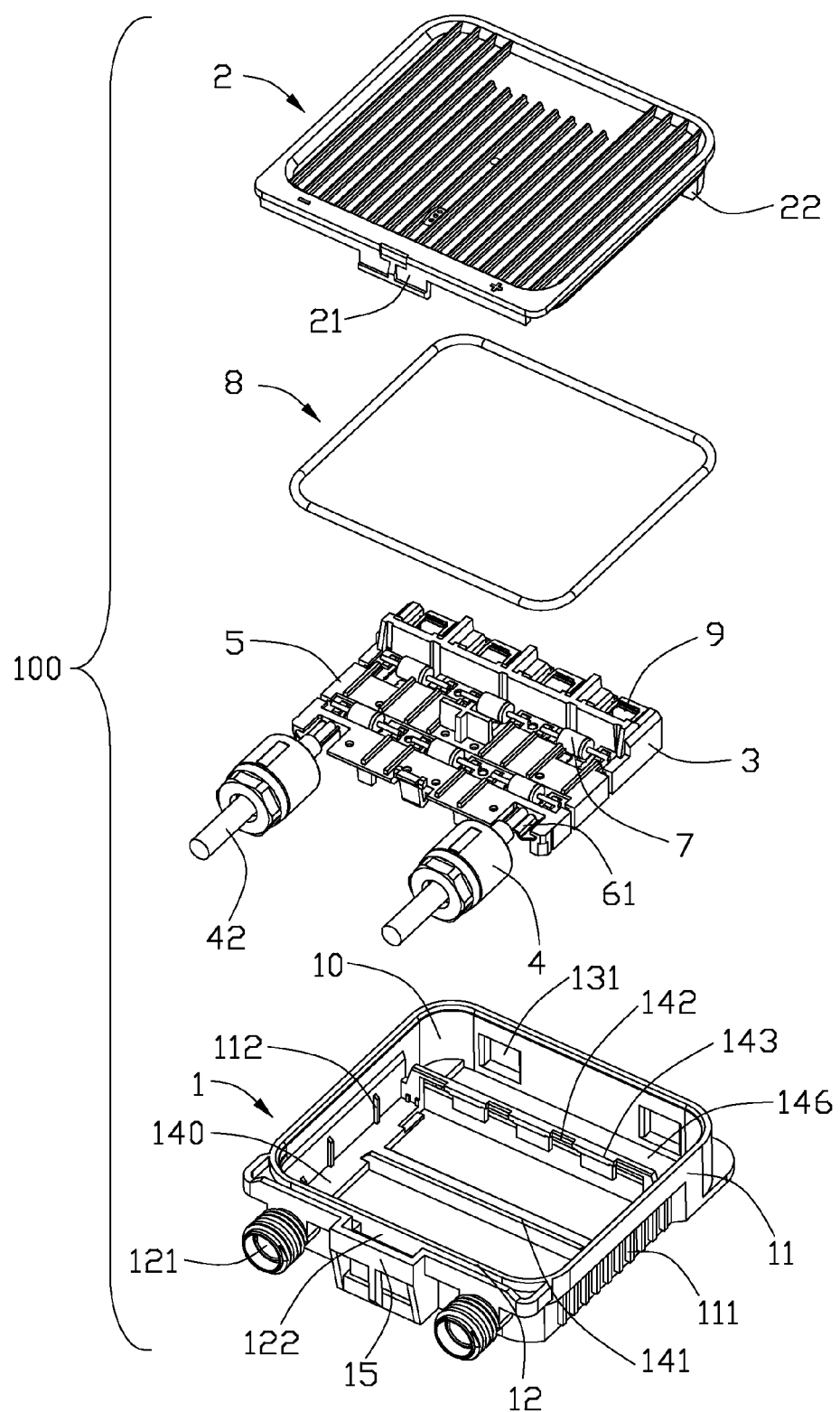
FIG. 3 a partly exploded perspective view of the junction box with a cover separated from the cable connecting box.
Figure 4:
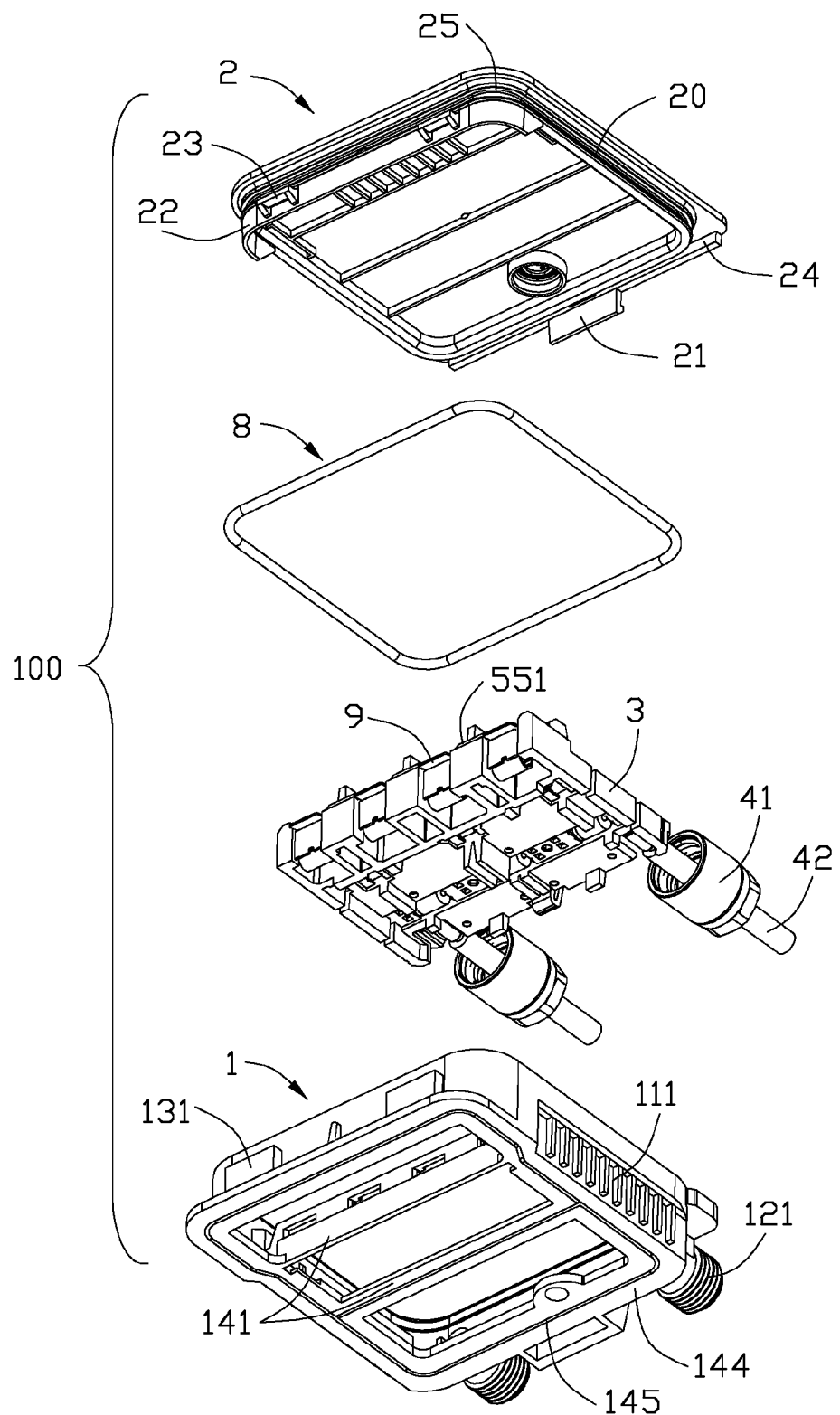
FIG. 4 is similar with FIG. 3, but taken from another view.
Figure 5:
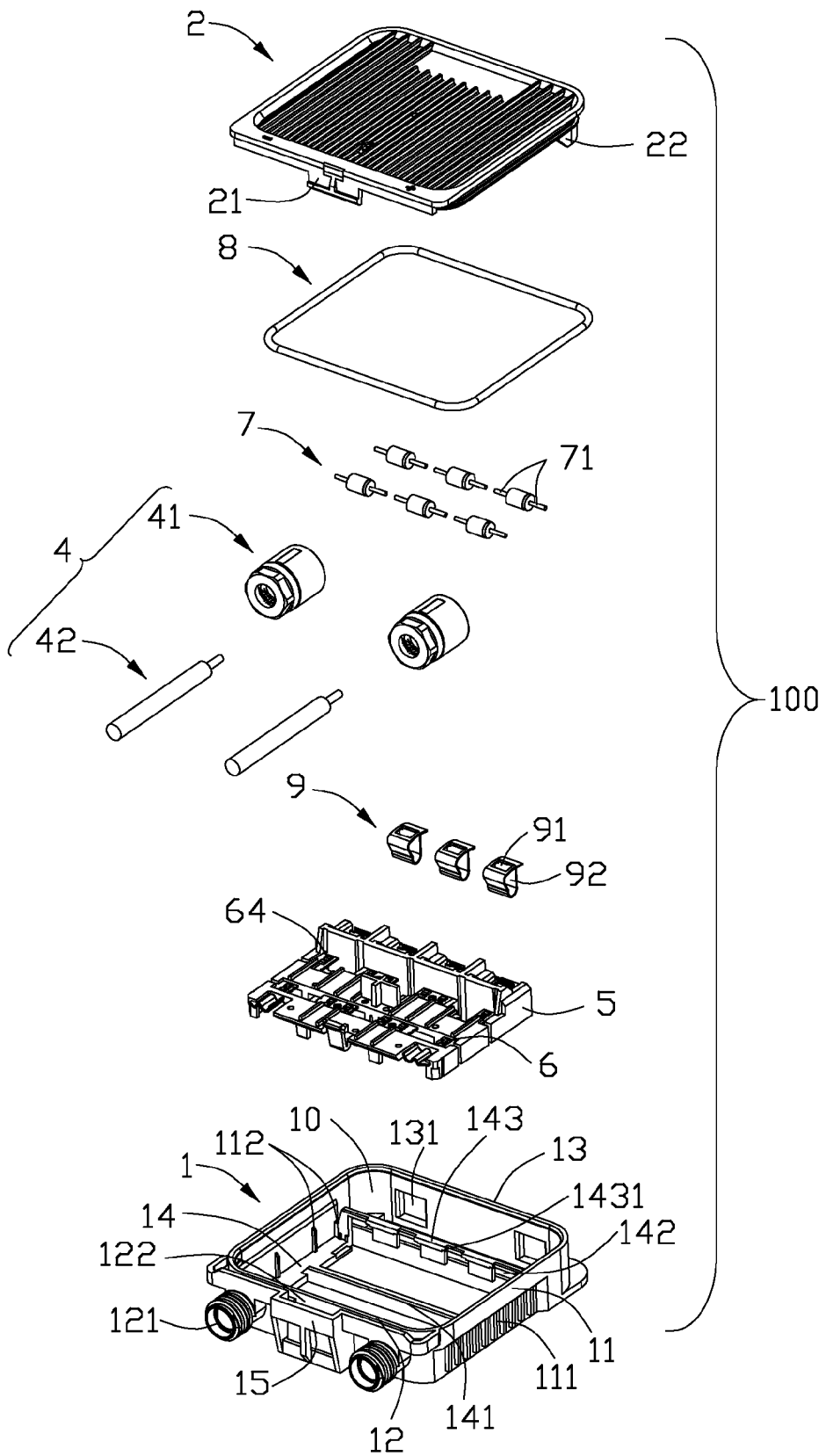
FIG. 5 is an exploded perspective view of the junction box.
Figure 6:
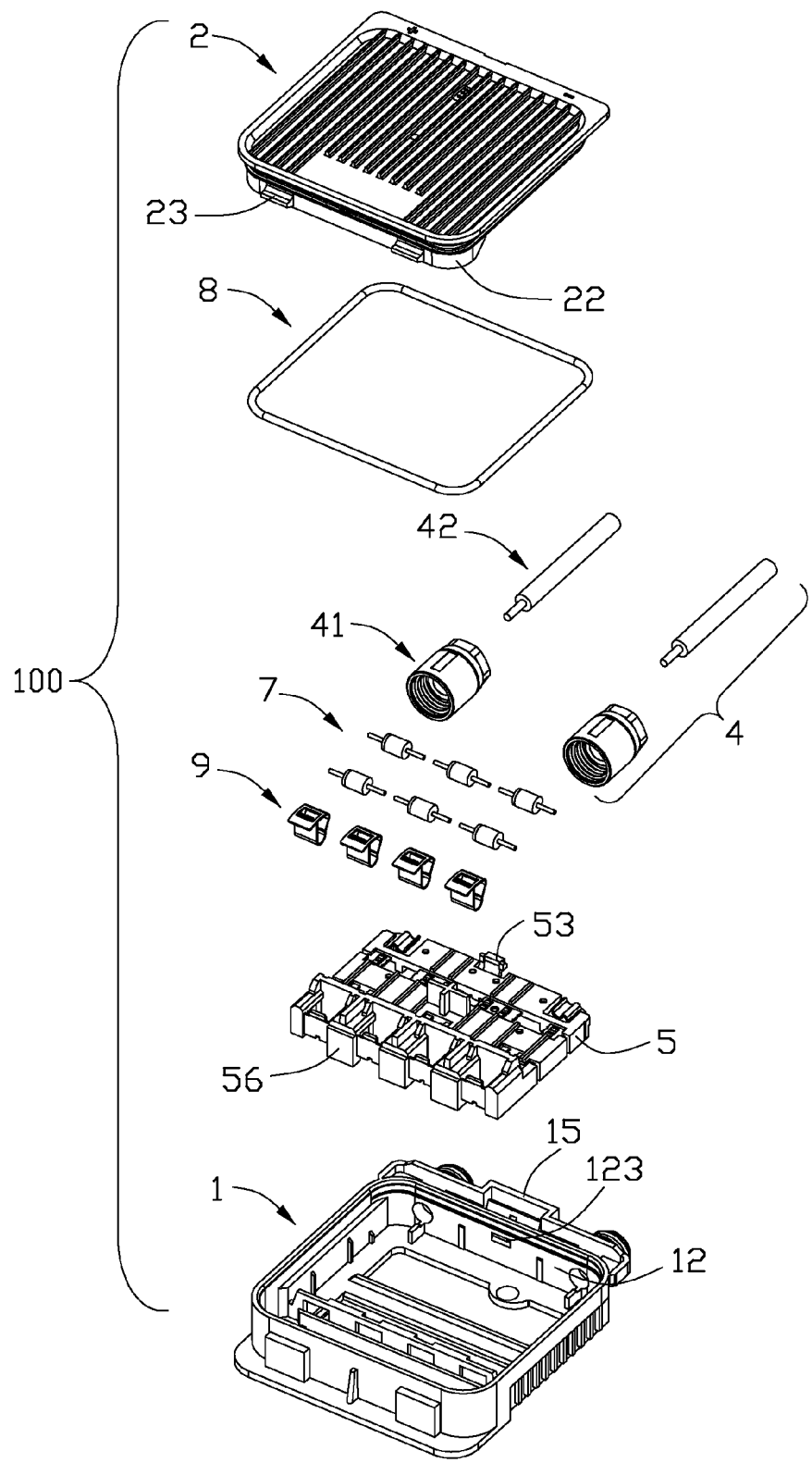
FIG. 6 is similar with FIG. 5, while taken from a different aspect.
Figure 7:
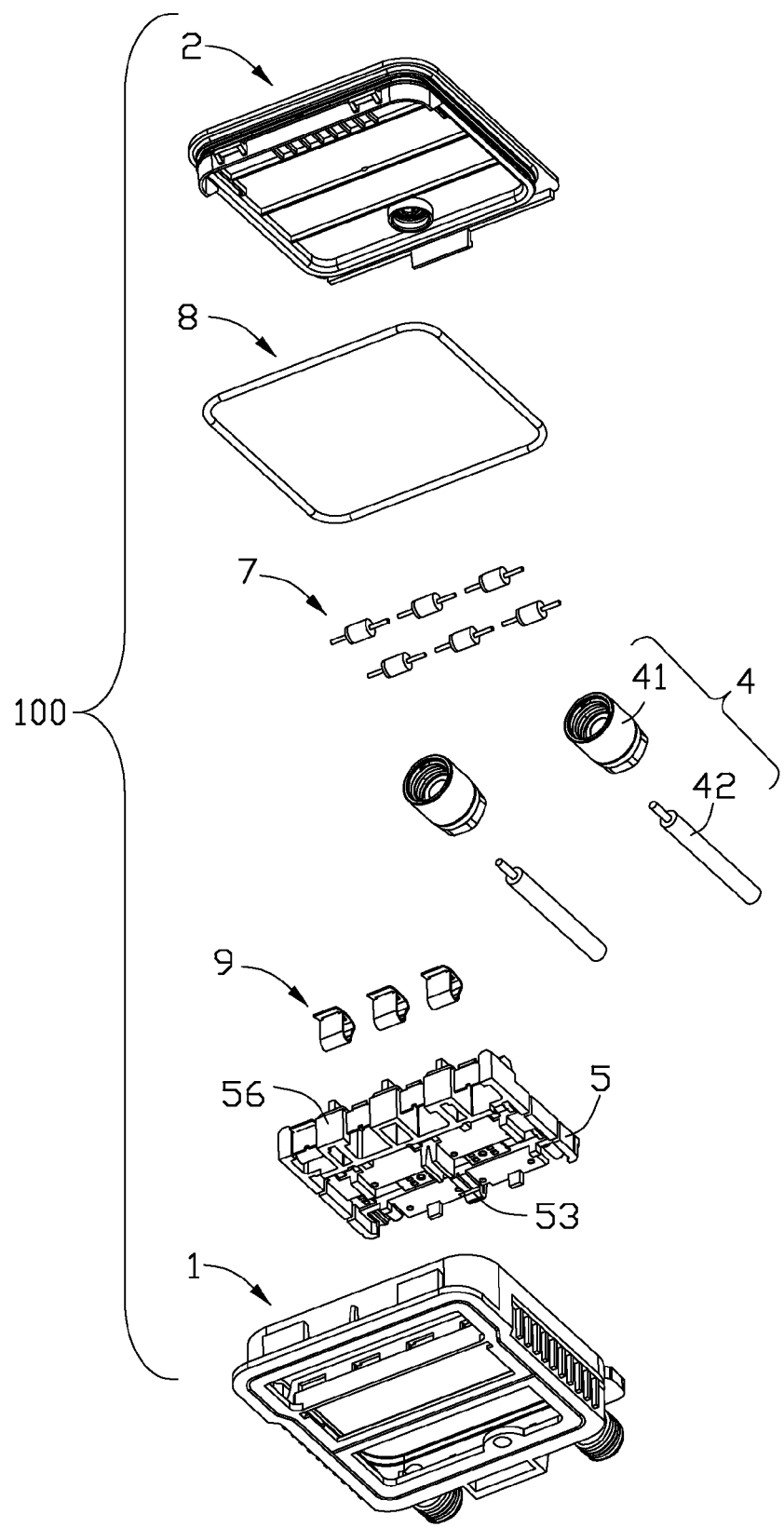
FIG. 7 is similar with FIG. 6, while taken from another different aspect.
Figure 8:
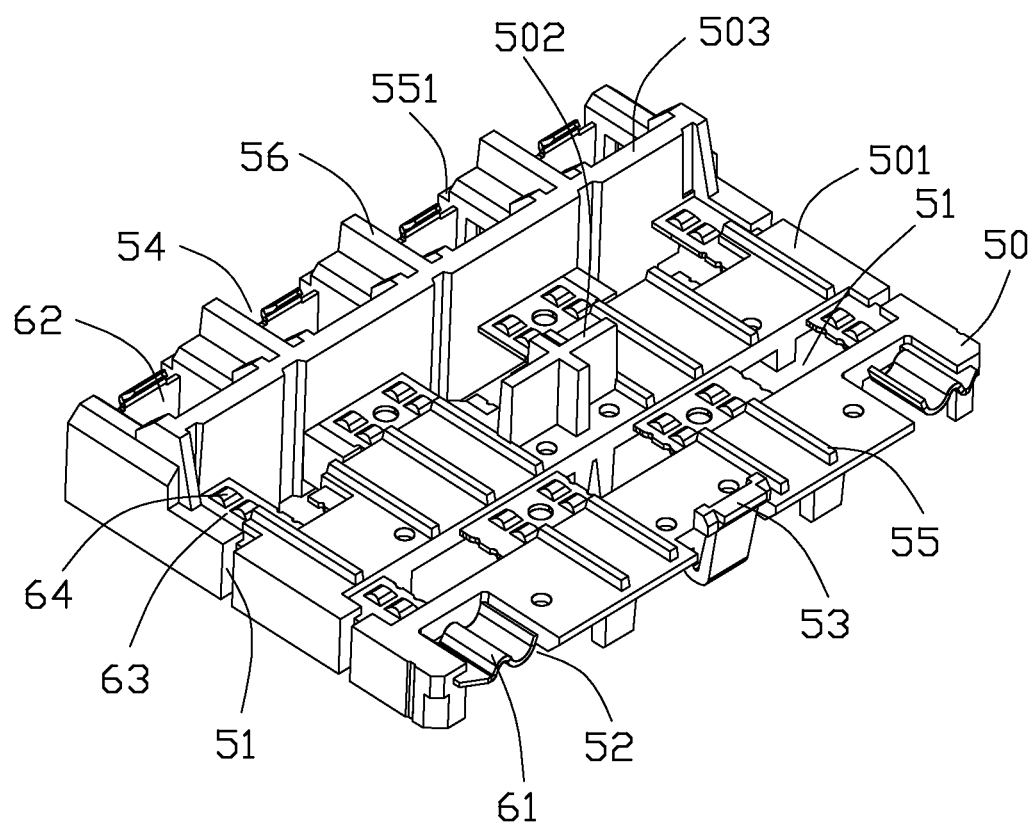
FIG. 8 is a perspective view of a wire connecting module of the junction box.

Please referring to FIGS. 3-4, the wire connecting module 3 includes a insulative block 5 presented as a rectangular shape, a plurality of metal connecting foils 6 and a plurality of diodes 7 connecting with two neighborly of said plurality of metal connecting foils 6.

Please referring to FIGS. 4-8, the insulative block 5 has a body portion 50 approximately shaped as a rectangular plate, a plurality of hollows 51 extending through the body portion 50 along an up-to-down direction. The body portion 50 has a top face 501 facing the cover 2 and a plurality of ribs 55 protruding upwardly from the top face 501.

In present invention, the insulative block 5 has two such hollows 51 arranged along a front-to-back direction. The insulative block 5 is divided into three portions along the front-to-back direction by the hollows 51, which extend along a transverse direction vertical to the front-to-back direction of the body portion 50. The first portion of the body portion 50 is formed with a pair of first escaping portions 52 at two sides of a front end thereof and a hook 53 at a middle of the front end thereof. The first escaping portions 52 extend through the body portion 50 along the up-to-down direction. The hook 53 extends forwardly and downwardly, then bents upwardly from the middle of the body portion 50. By this arrangement, the hook 53 may has a better resilient property to be removed easily.

The second portion of the body portion 50 includes a supporting portion 502 extending upwardly from the top surface 501 to support the cover 2. The third portion of the body portion 50 has a fence 503 extending along the transverse direction and located at a rear of the second portion, and a plurality of second escaping portions 54 recessed forwardly from a rear edge thereof. Each two adjacent second escaping portions 54 has a separating wall 56 therebetween. The separating wall 56 defines a plurality of depressions 551 at a top of a rear end of the separating plate 56. The ribs 55 extend along the front-to-back direction and are distributed uniformitily on the top face 501 to enlarge an area for heat dissipation. The ribs 55 are parallel to each other. The ribs 55 provide a lager area for the junction box 100 heat dissipate timely.

The connecting foils 6 have a plurality of connecting portions 61 connecting with the cable 4 and received in the first escaping portions 52, a plurality of base portions mostly insert-molded in the body portions 50 and extending backwardly along a mating direction of the cable 4, and a plurality of contacting portions 62 extending backwardly from the base portion and connecting with the photovoltaic module. The base portions further have a plurality of soldering portions 63 exposed in the hollows 51. The soldering portions 63 have a plurality of embosses 64 protruding upwardly, each soldering portion 63 has a pair of embosses 64.

The junction box 100 further has a plurality of clamp springs 9 for clamping the contacting portions 62 of the connecting foils 6 and a plurality of contacting plates (not labeled) of the photovoltaic module. One end of the clamp spring 9 defines a through hole 91, the other end of the clamp spring 9 has a tab 92 with a width of the tab 92 smaller than that of a body of the clamp spring 9. The tab 92 extends through the through hole 91, and the contacting portion 62 is clamped between the tab 92 and an inner wall of the through hole 91. Insert the contacting plate of the photovoltaic module into an area between the tab 92 and the inner wall of the through hole 91 and be clamped by the tab 92 and the inner wall of the through holes 91 to electrically connect the junction box 100 with the photovoltaic module.

Each of the diodes 7 has a pair of tails 71 extending outwardly from two sides thereof, each tail 71 is soldered between two adjacent embosses 64 of the soldering portions 63.

Please referring to FIGS. 1-7, and FIG. 10, the insulative body 1 presents as a rectangular box, including two side walls 11, a front wall 12 and a rear wall 13 connecting the two side walls 11, a receiving cavity 10 surrounding by the side walls 11, the front wall 12 and the rear wall 13. The insulative body 1 further comprises a bottom wall 14 located under the receiving cavity 10 and a supporting portion 15 connecting with two side walls 11 and located in front of the front wall 12. The supporting portion 15 presents as a T shape. The front wall 12 defines two side by side mounting holes 121 with exterior thread, from which the cable extending through to connect with the connecting portions 61. The mounting holes 121 are located under the supporting portion 15. A locking slot 122 is defined between the supporting portion 15 and the front wall 12 and opening upwardly, and a resilient locking portion 151 is formed in the locking slot 122. Please reference to FIGS. 10-11, the resilient locking portion 151 is extending upwardly from a bottom of the looking slot 122. A depressing slot 123 is recessed from a surface facing to the receiving cavity 10 for locking with the hook 53 of the insulative block 5. Please reference to FIG. 6, the hook 53 and the depressing slot 123 engage with each other, when the insulative block 5 is damaged, the user can remove the insulative block 5 away from the junction box 100 by levering the hook 53. So, the junction box 100 can be partly replaced to save cost. The two side walls 11 have a plurality of ribs 111 extending along the up-to-down direction on outsides of the side walls 11 to enlarge an area for heat dissipation. A plurality of position blocks 112 extend inwardly along the up-to-down direction on insides of the side walls 11 to engage with the insulative block 5.

The rear wall 13 defines two locking holes 131 extending through thereof along a front-to-back direction. The bottom wall 14 has a plurality of windows (not labeled) and two bridges 141 extending along a transverse direction between the windows and being parallel to each other. One of the bridge 141 closed to the rear wall 13 defines a plurality of openings 142 extending therethrough along a front-to-back direction and arranged side by side, the bridge 141 further has an pressing portion 143 located between two neighborly openings 142 to engage with the depression 551. A passageway 146 is formed between the bridge 141 near to the rear wall 13 and the rear wall 13 for the contacting plates of the photovoltaic module inserting into. Two sides of the pressing portion 143 extend outwardly till the opening 142 to from a pair of engaging portions 1431 to abut against a free end of the clamp spring 9 with the through hole 91 to prevent the clamp spring 9 from loosing. The bottom wall 14 defines an inner face 140, a mounting face 144 opposite to the inner face 140 and a slit 145 depressing from the mounting face 144, the slit 145 is shown in a circle surrounding in the mounting face 144. The slit 145 can absorb much more glue which is used to stick the junction box 100 to the PV module to get a well combination.

Figure 9:
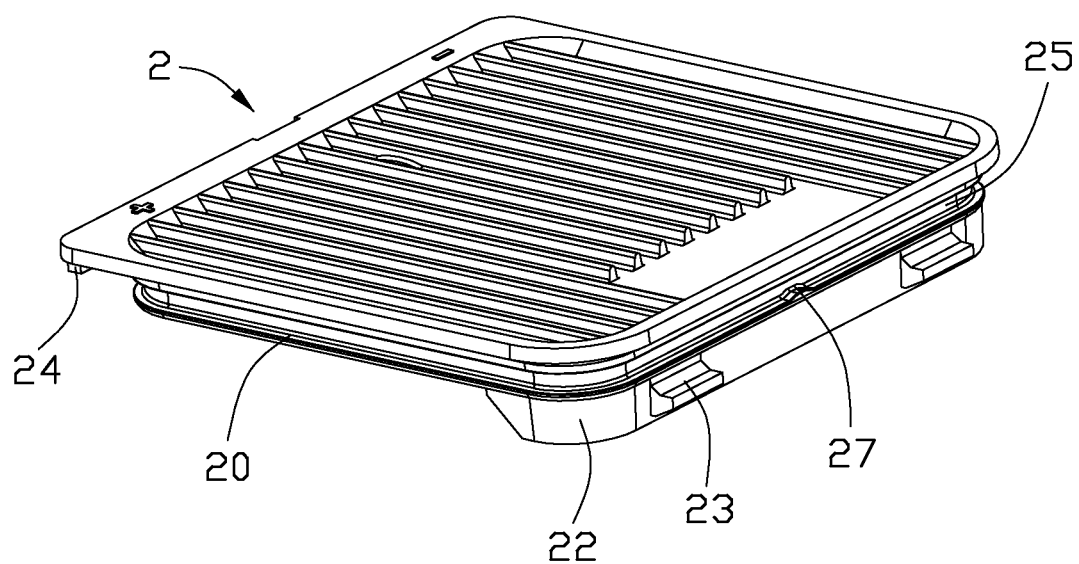
FIG. 9 is a perspective view of a cover of the junction box.
Figure 10:
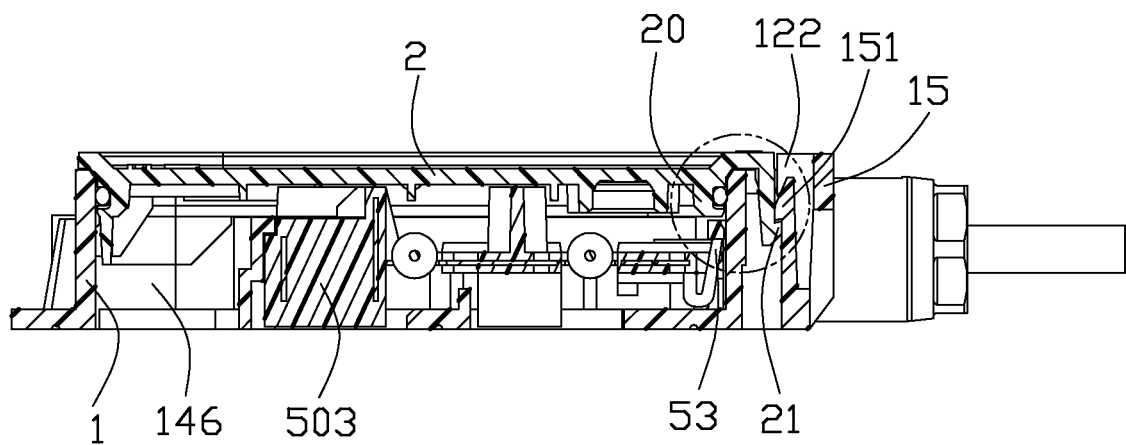
FIG. 10 is a cross-sectional view of the junction box taken along line 10-10 of FIG. 1.
Figure 11:
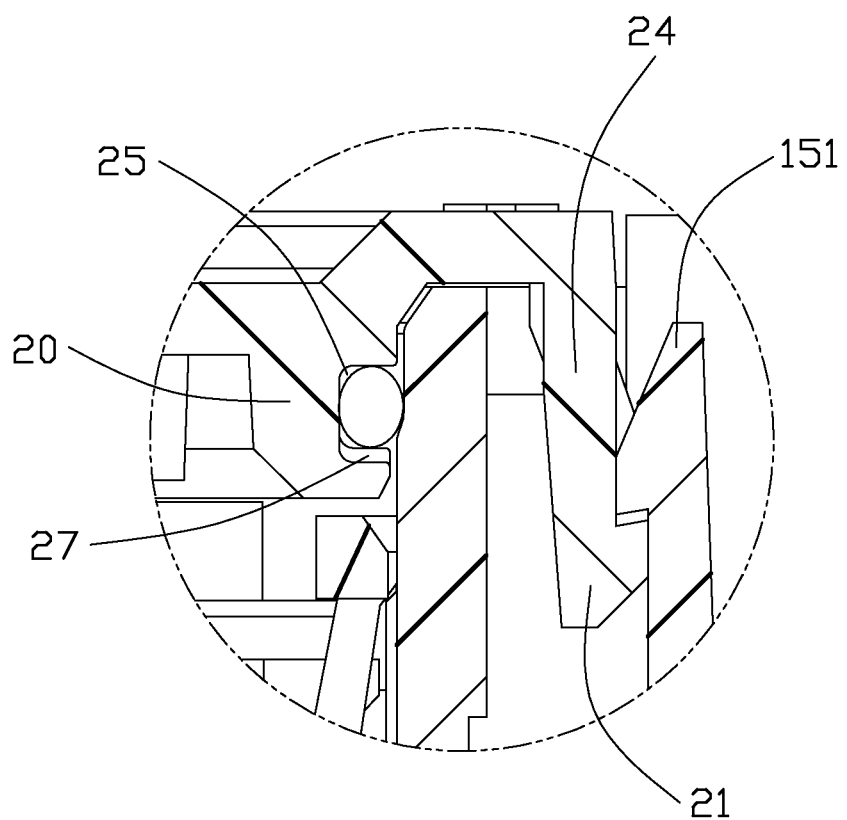
FIG. 11 is an enlarged view of the junction box in a circuit map to FIG. 10.

Please reference to FIGS. 9-11, the cover 2 comprises a plurality of separating walls 20 extending downwardly from all-around the cover, the separating walls 20 connect with each other and abut against with an inner surface of the walls of the insulative body 1. The cover further comprises a pretending wall 24 extending downwardly form a front side of the cover and being Parallel to the front wall 12 of the insulative body 1. The pretending wall 24 is located between the front wall 12 and the supporting portion 15. The cover 2 further comprises a latching portion 21 to lock with the resilient locking portion 151 of the insulative body 1. The latching portion 21 also can be set as a slot or a resilient finger. In the present invention, the latching portion 21 is a resilient finger locking with the resilient locking portion 151, and the pretending wall 24 is mostly received in the locking slot 122, a top face of the cover 2 and a top surface of the supporting portion 125 are coplanar to prevent user to open the junction box 100 only by hands. When the contacting portions 62 of the connecting foils 6 connect with the exterior contacting plates of the PV module in the passageway 146, for the contacting plates are easy to bent and may touch the inner wall of the insulative body 1 for its soft feature. A preventing blade 22 extends downwardly from a rear end of the cover 2 to provide an inner wall for the contacting plates depending on, so a height of the preventing blade 22 can increase a safe creepage distance for the junction box 100. The preventing blade 22 further has a plurality of protrusions 23 extending backwardly to lock with the locking holes 131 of the rear wall 13. The separating wall 20 defines a sealing slot 25 along its outside surfaces. An o-ring 8 mounted in the sealing slot 25 seals the insulative body 1 when the cover 2 covers the insulative body 1 to prevent water flowing into an inner side of the junction box 100. The o-ring 8 is made of silicone or plastics materials and is formed in a rectangular circuit configuration. The sealing slot 25 has a tuber 27 at a place of the mold commissure of the cover 2 to enlarge a deformation of the o-ring 8. The tuber 27 extends into the sealing slot 25 from a bottom face thereof.

The cables 4 include two nuts 41 with interior thread and two wires 42 extending through the nuts 41 along a front-to-back direction. The interior threads of the nuts 41 match to the exterior threads of the mounting holes 121. The wires 42 insert into the insulative body 1 through the mounting holes 121 and electrically connect with the connecting portions 61 of the connecting foils 6 through the mounting holes 121, to finally position the cables to the insulative body 1.

As fully described above, based on engagement between the hook 53 and the depressing slot 123, when the insulative block 5 is damaged, the user can remove the insulative block 5 away from the junction box 100 by levering the hook 53. So the junction box 100 can be partly replaced to save cost.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A junction box, comprising:
a cable connecting body including an insulative body formed with a plurality of walls with a receiving cavity depressing on a top side thereof and a wire connecting module attached and received in the receiving cavity of the insulative body, the wire connecting module having an insulative block, a plurality of connecting foils insert-molded with the insulative block and a plurality of diodes connecting two neighborly of said connecting foils, the insulative block having a hook at a middle of the front thereof, and the insulative body having a front wall, the front wall defining a depressing slot recessed from an inside surface thereof facing the receiving cavity to lock with the hook and retain the insulative block in the receiving cavity of the insulative body;
a cover assembled to the insulative body and covering the insulative box; and
a cable extending through the front wall and inserting into the insulative body to electrically connect with the connecting foils.

2. The junction box as claimed in claim 1, wherein the insulative body further comprises two side walls and a rear wall opposite to the front wall, the front wall connects with the two side walls, the depressing slot depresses on the front wall and faces the rear wall.

3. The junction box as claimed in claim 1, wherein the hook extends downwardly from the front side of the insulative block and then upwardly beyond the insulative block.

4. The junction box as claimed in claim 3, wherein the insulative body comprises a pair of mounting holes extending through the front wall for the cable extending therethrough.

5. The junction box as claimed in claim 4, wherein the insulative body further comprises a supporting portion located outside the front wall and having a T shape.

6. The junction box as claimed in claim 4, wherein the connecting foils comprises a plurality of base portions, a plurality of connecting portions extending beyond a front end of the insulative block to connect with the cable.

7. The junction box as claimed in claim 6, wherein the insulative block comprises a plurality of hollows arranged along a front-to-back direction and dividing the insulative block into several parts.

8. The junction box as claimed in claim 7, wherein the insulative block defines a pair of first escaping portions at a front edge thereof to receive the connecting portions of the connecting foils, the hook is disposed between the two first escaping portions to abut against the front wall of the insulative body.

9. The junction box as claimed in claim 3, wherein the insulative block further comprises a plurality of depressions in an end opposite to the hook, the insulative body comprises a plurality of pressing portions formed on a bottom wall thereof and abutting against inner walls of the depressions.

10. A junction box comprising:
a cable connecting body having an insulative body formed with a plurality of walls and a wire connecting module, the wire connecting module having an insulative block, a plurality of connecting foils retained in the insulative block and a plurality of diodes connecting with two of said connecting foils, the connecting foils having a plurality of contacting portions for connecting with a photovoltaic module;
a cover mounted to the insulative body along an upper to down direction for covering the insulative body; and
a plurality of clamp springs assembled to an rear side of the insulative block for clamping the contacting portions, each clamp spring having one end defining a through hole and an other end being received and extending through the through hole to form a loop structure; wherein
the insulative body further comprises a plurality of engaging portions at a back side thereof downwardly pressing a free ends of the plurality of clamp springs to prevent the clamp springs from releasing.

11. The junction box as claimed in claim 10, wherein the connecting foils are insert-molded with the insulative block, and the insulative body has a receiving cavity and a bottom wall under the receiving cavity, the wire connecting module is retained to the bottom wall, the engaging portions are formed on the bottom wall of the insulative body.

12. The junction box as claimed in claim 11, wherein the insulative block comprises a plurality of hollows arranged along a front-to-back direction and dividing the insulative block into several parts.

13. The junction box as claimed in claim 11, wherein the insulative block further comprises a plurality of ribs located on an outside surface thereof and extending along a front-to-back direction.

14. The junction box as claimed in claim 13, wherein the ribs are parallel to each other.

15. The junction box as claimed in claim 10, wherein the connecting foils comprise a plurality of base portions, a plurality of connecting portions extending beyond a front end of the insulative block for connecting with a cable.

16. A junction box comprising:
a cable connecting body having an insulative body formed by a plurality of walls with a receiving cavity therein, and a wire connecting module, the wire connecting module having an insulative block received in the receiving cavity, a plurality of connecting foils retained in the insulative block and a plurality of diodes connecting with two of said connecting foils, the connecting foils having a plurality of contacting portions for connecting with a photovoltaic module;
a plurality of clamp springs assembled to an rear side of the insulative block for clamping the contacting portions, each clamp spring having one end defining a through hole and an other end being received and extending through the through hole to form a resilient loop structure; wherein
the insulative body further comprises a plurality of engaging portions at a rear side thereof, each of said engaging portions downwardly pressing a free end of the corresponding clamp spring to prevent said clamp spring from releasing.

17. The junction box as claimed in claim 16, wherein the insulative block includes a resilient hook latched to a front side of the insulative body.

* * * * *